United States Patent [19]

Shibayama et al.

[11] 4,438,488

[45] Mar. 20, 1984

[54] DATA PROCESSING SYSTEM WITH A SLAVE COMPUTER USING DATA REGISTERS AS THE SOLE OPERAND STORE

[75] Inventors: Shigeki Shibayama; Kazuhide Iwata, both of Yokohama, Japan

[73] Assignee: Tokyo Shibauru Denki Kabushiki Kaisha, Kawasaki, Japan

[21] Appl. No.: 160,490

[22] Filed: Jun. 18, 1980

[30] Foreign Application Priority Data

Jun. 26, 1979 [JP] Japan .................................. 54/79662

[51] Int. Cl.³ ........................ G06F 9/38; G06F 15/332
[52] U.S. Cl. .................................... 364/200; 364/736; 364/576; 364/726
[58] Field of Search ... 364/200 MS File, 900 MS File, 364/413–417, 570, 572, 576–577, 715, 736, 726

[56] References Cited

U.S. PATENT DOCUMENTS

| | | | |
|---|---|---|---|
| 3,611,300 | 10/1971 | Aldrich et al. | 364/200 |
| 4,044,240 | 8/1977 | Cox, Jr. et al. | 235/151.3 |
| 4,050,097 | 9/1977 | Miu et al. | 364/200 |
| 4,099,236 | 7/1978 | Goodman et al. | 364/200 |
| 4,107,773 | 8/1978 | Gilbreath et al. | 364/200 |
| 4,128,876 | 12/1978 | Ames et al. | 364/200 |
| 4,135,347 | 1/1979 | Gordon et al. | 364/414 |
| 4,149,249 | 4/1979 | Pavkovich | 364/414 |
| 4,258,420 | 3/1981 | Negi et al. | 364/200 |
| 4,259,725 | 3/1981 | Andrews et al. | 364/521 |
| 4,302,818 | 11/1981 | Niemann | 364/736 |
| 4,334,285 | 6/1982 | Kawakita et al. | 364/761 |
| 4,368,514 | 1/1983 | Persaud et al. | 364/200 |
| 4,393,457 | 7/1983 | New | 364/726 |

OTHER PUBLICATIONS (WO 80/00758) J. A. Propster, *Modular Programmable Signal Processor*, (PCT Patent Application), published Apr. 17, 1980, FIGS. 1 & 18.
G. Horvath, *A Multiprocessor System for Real-Time Spectrum Analysis*, May 1979, pp. 355–363.
H. Hattori et al., *The Development of Shimadzu 213*, Dec. 1977.
E. E. Swartzlander, Jr. et al., *Inner Product Computers*, IEEE Transactions on Computers, vol. C-27, No. 1, Jan. 1978, pp. 21–31.

*Primary Examiner*—James D. Thomas
*Assistant Examiner*—Archie E. Williams
*Attorney, Agent, or Firm*—Finnegan, Henderson, Farabow, Garrett & Dunner

[57] ABSTRACT

In a data processing system having a slave computer connecting to a host central processing unit and a host main memory, the slave computer has no internal random access memory and includes an arithmetic logic operating means. The arithmetic logic operating means calculates an address of the host main memory. A DMA interface directly makes an access to the host main memory to fetch operand data into the slave computer. The arithmetic logic operating means computes the operand data under control of a microprogram control section and directly loads the computed result to the host main memory through the DMA interface.

8 Claims, 12 Drawing Figures

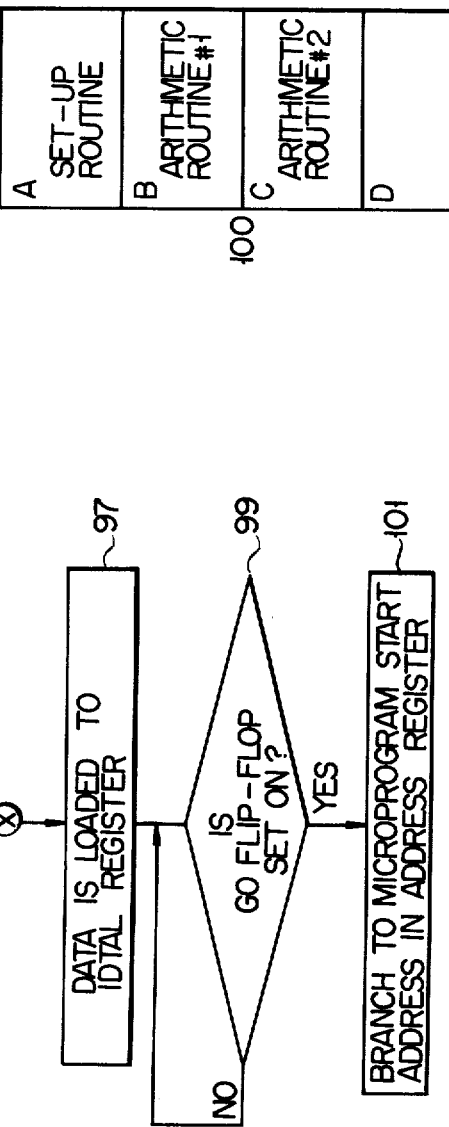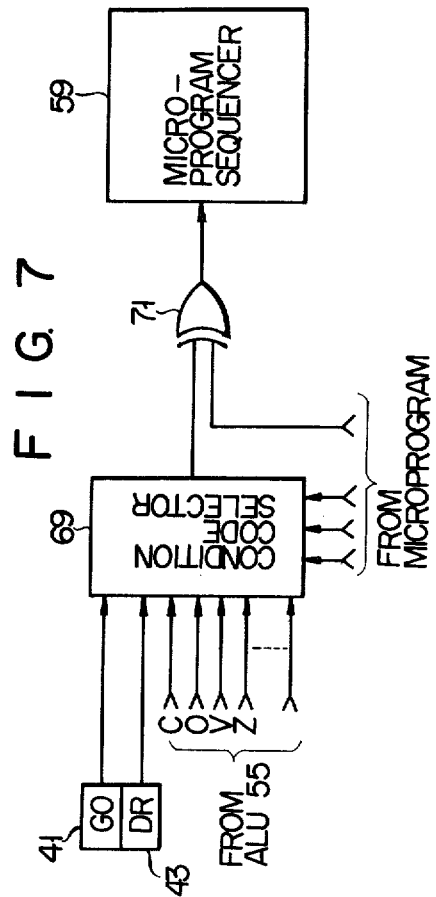

| ADDRESS | MNEMONIC | |
|---|---|---|
| b | M. REQ | |
| b + 1 | M. SYNC | |
| b + 2 | NOP | ↑ |
| b + 3 | NOP | |
| b + 4 | NOP | MEMORY CYCLE |
| b + 5 | NOP | ↓ |

DATA PROCESSING SYSTEM WITH A SLAVE COMPUTER USING DATA REGISTERS AS THE SOLE OPERAND STORE

The present invention relates to an electronic computer system and more particularly to a computer system which combines an ordinary computer system and an auxiliary computer system whereby the processes of the ordinary computer made at a low speed are carried out by the auxiliary computer and therefore the computer system as a whole operates at a high speed.

By convention, the computation as of a complex or lengthy task for the host computer is frequently assigned to an additional computer system, or a slave processor, appropriate for the computation. Such a slave computer system is commercially available now. A typical example of such is an array processor which executes the computation of array type data at high speed array processor (AP 120B) manufactured by Floating Point Systems Inc. in the USA and the AP 400 manufactured by Analogic Inc. in the USA. The details of the AP 400 are discussed in U.S. Pat. No. 4,135,247 granted to Gordon et al on Jan. 16, 1979.

Each of those systems has a high speed memory and an arithmetic logic unit. In operation, the computation data is fetched from a main memory of a host computer that fetched data is loaded into the high speed memory and it is then used for computation by an arithmetic logic unit. The results of the computation are loaded into the high speed memory and afterwards transferred to the main memory. In this way, a sequence of the data processing operation is completed.

This type apparatus is effective for an operation having many intermediate results of computation such as a Fast Fourier Transform, but is improper for a relatively simple processing in which the data in the main memory is subjected to a simple computation with little production of the intermediate computation result. The reason for this is that if the high speed memory holds the intermediate computation results and the results are accessed many times, the high speed feature is effectively used. If, however, with the processing requires no intermediate computation results, such a system operates merely as a buffer between the main memory and the arithmetic logic unit and uses the high speed feature ineffectively.

When $c_i = a_i + b_i$, $i = 1$, 1000 is computed by using the conventional array processor ($a_i$ and $b_i$ are stored in the main memory and the memory location for storing $c_i$ is also in the main memory), the data $a_i$ and $b_i$ are read out from the main memory and are transferred to an internal memory of the slave processor. Then, the addition for obtaining $c_i$ is performed by an internal arithmetic logic unit. The result of the addition is stored in the internal memory. After all of the results of the additions are computed, the total result is returned from the internal memory to the main memory. This operation is diagrammatically illustrated in the time scale in FIG. 1.

As a first step, the array data $a_i$ is read out from an address, which is generally needed at the time of the set-up and given in some way, and is transferred to the memory of the slave processor. This step is performed during time $\alpha$. The necessary address computation in this case is performed by the slave processor.

In the next step, the array data $b_i$ is likewise fetched from the main memory. This is performed during time $\beta$.

When the fetching of all of the array data $a_i$ and $b_i$ is completed, the slave processor reads out the array data $a_i$ and $b_i$ from the internal memory, adds those and loads again the result $c_i$ into the internal memory by using the internal arithmetic logic unit. Normally, the internal memory and the arithmetic logic unit of the slave computer are greater than the host computer, so the processing occurs at a high speed. This computation is performed during time $\gamma$.

When the computation (the addition in this case) of all of the array data is completed, the result of $c_i$ is transferred (loaded) from the internal memory to the main memory of the host computer. This operation is performed in a section $\delta$. Assuming that an access time of the main memory is $\tau_{am}$, and a processing time of the arithmetic logic unit is $\tau_{pr}$, the total of the computation time (provided that the main memory could be accessed exclusively), is given $$1000\tau_{am} + 1000\tau_{am} + 1000\tau_{pr} + 1000\tau_{am} = 300 0\tau_{am} + 1000\tau_{pr}.$$

Therefore, even if the arithmetic logic unit is operable at high speed ($\tau_{pr} \rightarrow 0$), the arithmetic time is determined by the access time $3000\tau_{am}$ to the main memory. Accordingly, it is not effective to provide an internal high speed memory in the slave computer for effecting such a processing. This is for the reason that the high speed performance of a slave processor contributes little to the reduction of the processing time. Furthermore, the high speed internal memory is expensive.

Accordingly, an object of the present invention is to provide a computer system with a good performance/cost ratio.

SUMMARY OF THE INVENTION

To achieve the above objects, there is provided a data processing system with a slave computer connecting to a host central processing unit and a host main memory characterized in that the slave computer comprises: arithmetic logic operating means of which the operation cycle is shorter than the memory cycle of the host main memory, and which computes the address of the host main memory; DMA interface means which is connected to the host main memory and the arithmetic logic operating means, and which directly makes an access to the host main memory in accordance with the address of the host main memory computed by the arithmetic logic operating means, and which directly stores the operation result of the arithmetic logic operating means in the host main memory; microprogram control means connected to the arithmetic logic operating means and the DMA interface means for controlling those means; input/output interface means connected to the host central processing unit and the microprogram control means to apply command information received from the host central processing unit to the microprogram control means; and clock circuit means connected to the arithmetic logic operating means, the microprogram control means and the DMA interface means for generating system clocks to operate those means.

In the present invention, a slave computer system which has no internal memory, is used for the array data computation and is connected to a host computer. The slave computer computes the data obtained by directly making a DMA access to the main memory of the host computer system through an interface, and loads the result of the computation into the main memory through that same interface.

In a preferred embodiment of the present invention, the slave computer has an arithmetic logic unit with a processing speed several times faster than the memory cycle of the main memory, which arithmetic logic unit is controlled by a microprogram control unit. The microprogram control unit has a number of microprogram routines corresponding to the computations. The host computer system drives the slave computer system to perform arithmetic and logic computations which require an extremely long time when made by the host CPU. Specifically, the host CPU gives a microprogram routine to be executed and information to indicate where operand data is stored in the main memory to the slave computer. Afterwards it gives a computation start command signal to the slave computer, so that the slave computer starts the required computations. Within one memory cycle, the arithmetic logic unit executes a plurality of steps of the processing including the address computations of the data to be read from or written in the main memory, as well as the normal computation. A great amount of data in the main memory is accordingly processed in a pipeline manner. For the pipeline processing, the slave computer must be synchronized with the main memory. To this end, the slave computer has an internal clock generator and means for inhibiting the oscillation of the internal clock for synchronizing with the memory cycle of the main memory.

BRIEF DESCRIPTION OF THE DRAWINGS

Other objects and features of the invention will be apparent from the following description taken in connection with the accompanying drawings, in which:

FIGS. 5A and 5B cooperate to form a flow chart of a set-up sequence for computing the data array, which is useful in explaining the operation of an embodiment of the computer system according to the invention;

FIG. 6 is a memory map of the microprogram shown in FIG. 2;

FIG. 7 is a block diagram of a detailed branching condition circuit shown in FIG. 2;

DESCRIPTION OF THE PREFERRED EMBODIMENTS

Figure 2:
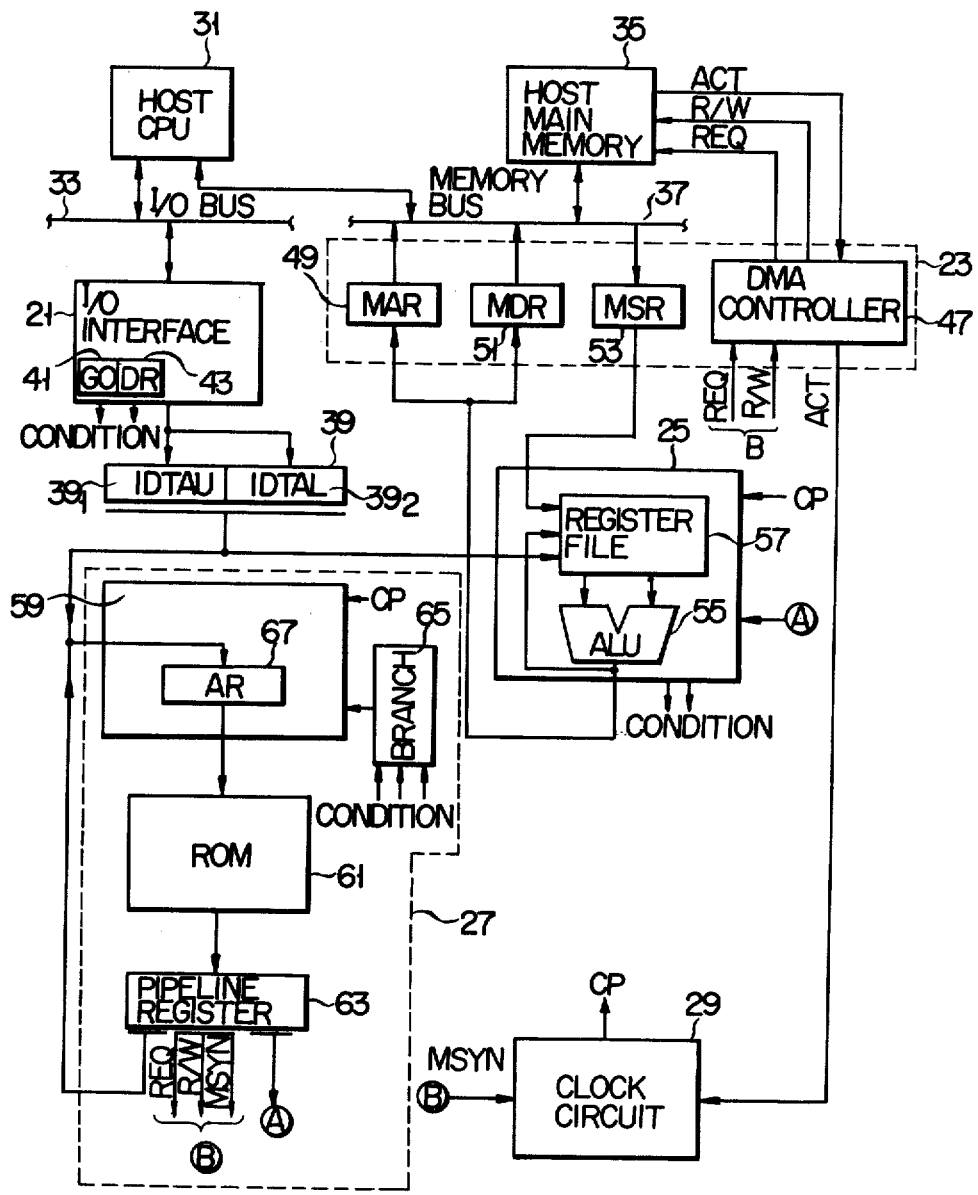
FIG. 2 is a block diagram of an embodiment of an electronic computer system according to the invention.

Reference is made to FIG. 2 illustrating a construction of a slave computer according to the present invention. This slave computer comprises an I/O interface 21, a DMA interface 23, an arithmetic logic section 25, a microprogram control unit 27 and a clock circuit 29.

The slave computer is connected through an I/O bus 33 to a host CPU 31 and through a memory bus 37 to a host main memory 35. A host computer system used in the embodiment in FIG. 2 is a conventional ordinary minicomputer.

The I/O interface 21 provides an interface between the slave computer and the host computer through the I/O bus 33 and gives a microinstruction (start address) to the slave computer and an interruption to the host CPU 31.

The data fed from the host CPU 31 is stored in an IDTA register 39. The I/O interface 21 has a flip-flop GO 41 and a flip-flop DR 43 for indicating a state of the I/O interface 21.

A DMA interface 23 fetches computation data from a main memory 35 or loads the result of computation by the arithmetic logic section 25 to the main memory 35. DMA interface 23 has a DMA controller 47, and various registers such as MAR 49, MDR 51 and MSR 53. The MAR 49 holds an address to fetch data from the main memory 35 or an address to store data into the main memory 35. The MDR 51 holds the computation result to be stored into the main memory 35. The MSR 53 holds the computation data fetched from the main memory 35.

Figure 1:
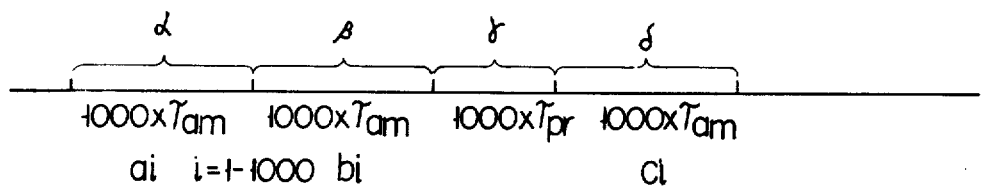
FIG. 1 is a time scale useful in explaining the computation of the array data by the conventional technique.
Figure 3:
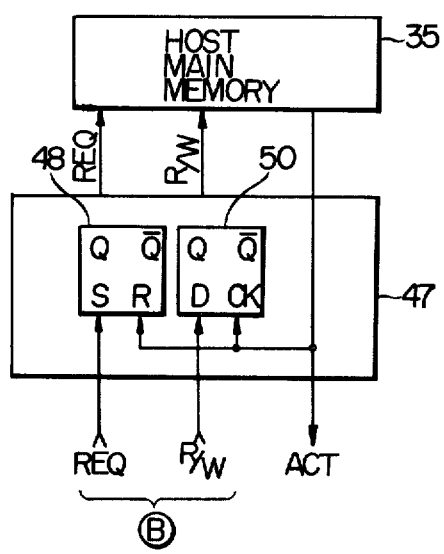
FIG. 3 is a block diagram of a detailed DMA controller shown in FIG. 2.

The DMA controller 47 is comprised of an RS flip-flop 48 and a D flip-flop 50, as shown in FIG. 3. The RS flip-flop 48 holds a memory request signal for the host main memory 35. The D flip-flop 50 holds a read/write signal for the host main memory 35. The RS flip-flop 48 is set by the memory request signal and is reset by an acknowledge signal derived from the host main memory 35. The D flip-flop 50 is set by the acknowledge signal. The acknowledge signal, when the memory request signal and the read/write signal are supplied to the host main memory 35, is an answer back signal outputted from the host main memory 35 to the DMA controller 47. The memory request signal and the read/write signal are produced from a pipeline register 63 of a microprogram control unit 27 to be described later. The DMA controller 47 passes the acknowledge signal to a clock circuit 29 to be described later.

An arithmetic logic section 25 has an ALU 55 and a register file 57 which executes the computation directed by a microprogram control section 27. The embodiment in FIG. 2 uses four 4-bit slice bipolar microprocessors (Am 2901) manufactured by AMD Co., USA, an ALU of 16 bits and 16 registers.

A microprogram control section 27 comprises a microprogram sequencer 59, a microprogram memory (ROM) 61, a pipeline register 63 and a branch condition circuit 65.

A microprogram sequencer 59 such as a microprogram sequencer (Am 2910) manufactured by AMD Co., USA, has an address register 67 therein. The microprogram memory (ROM) 61 holds an operation routine performed by the arithmetic logic section 25 and a set-up routine to be described later. By an address held by the address register 67, a specific microinstruction in a specific routine is read out from a microprogram memory (ROM) 61 and is loaded into a pipeline register 63. The arithmetic logic section 25, a DMA interface 23 and the various registers are controlled in accordance with the microinstruction. The branch condition circuit 65 provides a branch command to the microprogram sequencer 59 to branch the microprogram in accordance with various flip-flop states within the arithmetic logic section 25 and the I/O interface 21.

The clock circuit 29 has a function as a synchronizing circuit with respect to the memory access, as described later, as well as a function to send a clock signal CP to various sections of the slave computer.

The operation of the computer system as mentioned above will be described in detail. As mapped in FIG. 4, the main memory 35 stores 1000 data $a_i$ ($i=1$, 1000) in addresses 1000 to 1999, 1000 data $b_i$ ($i=1000$) in addresses 2000 to 2999, and the addition result $c_i$ ($i=1$, 1000) of those corresponding data in addresses 3000 to 3999.

Figure 5A:
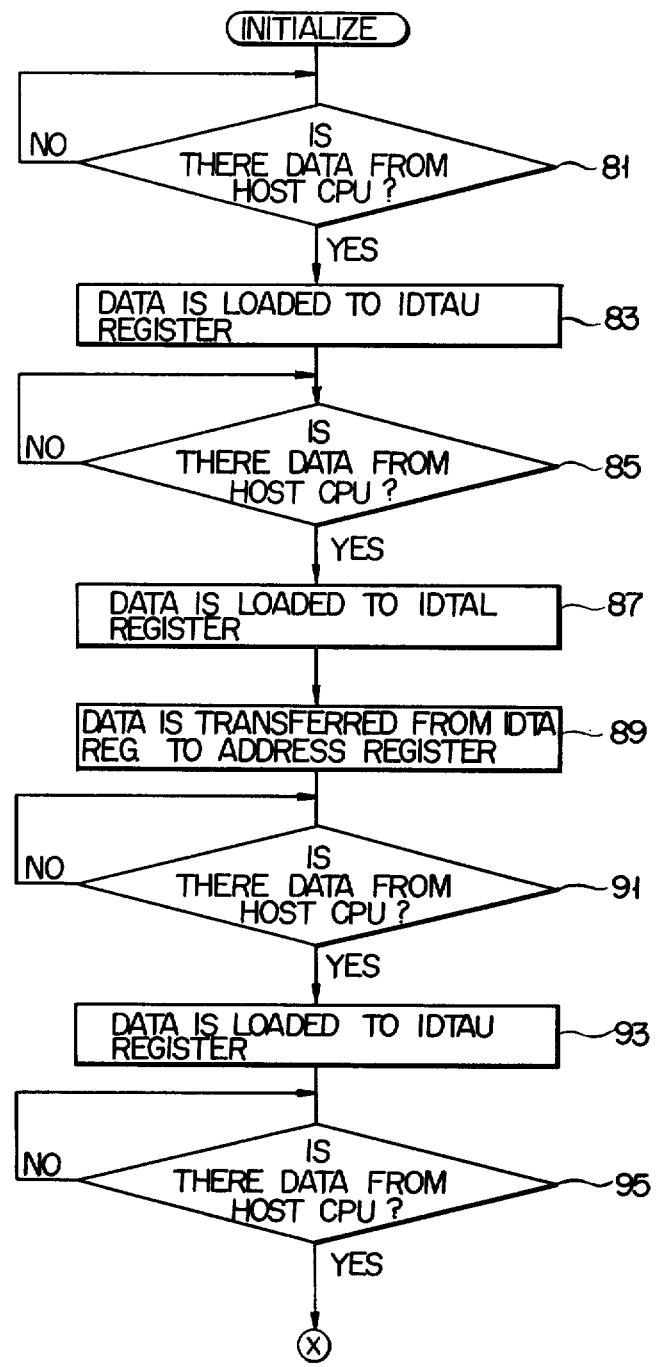

Firstly, the host CPU 31 provides a set-up operation. In FIGS. 5A and 5B, a flow chart of a set-up sequence is illustrated.

The set-up sequence starts in response to an initialize command delivered through the I/O interface 21 from the host CPU 31. The initialize command initializes the various flip-flops (including those not shown) within the slave computer and the microprograms as well. In the ROM 61, the set-up routine and various arithmetic routines are stored as shown in FIG. 6. In response to the initialize command, the set-up routine starts. Then, the host CPU 31 transfers a code representing $c_i = a_i + b_i$ to the IDTA register 39. Since the IDTA register 39 has a 16-bit width, the code is transferred two times and is set in the registers IDTAU $39_1$ and IDTAL $39_2$ having each an 8-bit width.

In a block 81, the I/O interface 21 checks if the data (8-bit data of 16 bits) delivered from the host CPU 31 is present or not and, if not present, holds the wait loop till the data appears. If the data is present, the I/O interface 21 loads the data into the IDTAU register $39_1$ (block 83). Then, in a block 85, the I/O interface 21 checks if the next data (the remaining 8-bit data of the 16 bits) is present or not. If it is absent, the interface 21 holds a wait loop till the data appears. If the data is present, the interface 21 loads the data into the IDTAL register $39_2$ (block 87). The code of the IDTA register 39 thus obtained is a start address of the arithmetic routine denoted as #2 for computing $c_i = a_i + b_i$. When data is set in the IDTA register 39, the DR flip-flop 43 is set and the set-up routine loads the contents of the IDTA register 39 into the address register AR 67, when the DR flip-flop 43 detects the set (block 89).

Then, the I/O interface 21 checks if the host CPU 31 has transferred the table address (8 bits of the 16 bits) or not. If the address is transferred from the host CPU 31, the I/O interface 21 receives and loads it into the IDTAU register $39_1$ (block 93). The I/O interface 21 receives the table address of the remaining 8 bits from the host CPU 31 and loads it into the IDTAL register $39_2$ (blocks 95 and 99). The table address indicates location in which a table representing the first addresses of the data $a_i$, $b_i$ and $c_i$ (addresses 1000, 2000 and 3000) and the number (1000) of the data, is stored in the main memory 35.

Figure 4:
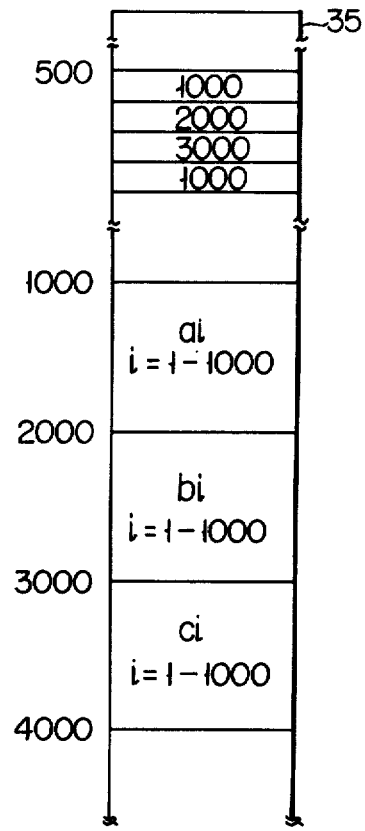
FIG. 4 is a memory map of a host main memory shown in FIG. 2.

As shown in FIG. 4, if the table is stored in the addresses 500 to 503, the data "500" is loaded as a table address into the IDTA register 39. The data in the IDTA register 39 is defined by the table handled in the microprogram, so that the contents of the table change as the kind of the operation to be executed changes.

Through the above-mentioned operation, the data necessary to start the operation are set up and therefore the host CPU 31 sends a GO command to the I/O interface 21. The GO flip-flop 41 is set by the GO command. A state of the GO flip-flop 41 has been supplied to the branch condition circuit 65. As shown in a block 99, when the set-up routine detects this, the microprogram is branched to an address held in the address register 67 and the execution of the arithmetic routine #2 starts (block 101).

The branching condition circuit 65 will briefly be described referring to FIG. 7. In the figure, the branch condition circuit 65 is comprised of a condition code selector 69 and an polarity control exclusive OR 71. The selector 69, which has been supplied with the information of the flip-flops, selects the contents of any of the flip-flops. Exclusive OR gate 71 supplies a signal based on the selected flip-flop's contents to direct the branch to the microprogram sequencer 59. In this case, if the arithmetic routine #2 is allocated in the address 100 of the ROM 61, "100" set in the pipeline register 63 is supplied to the ROM 61 through a selector (not shown) and a branch to the address 100 takes place. Of course, the address 100 is related to the microprogram and not to the main memory.

Figure 8A:
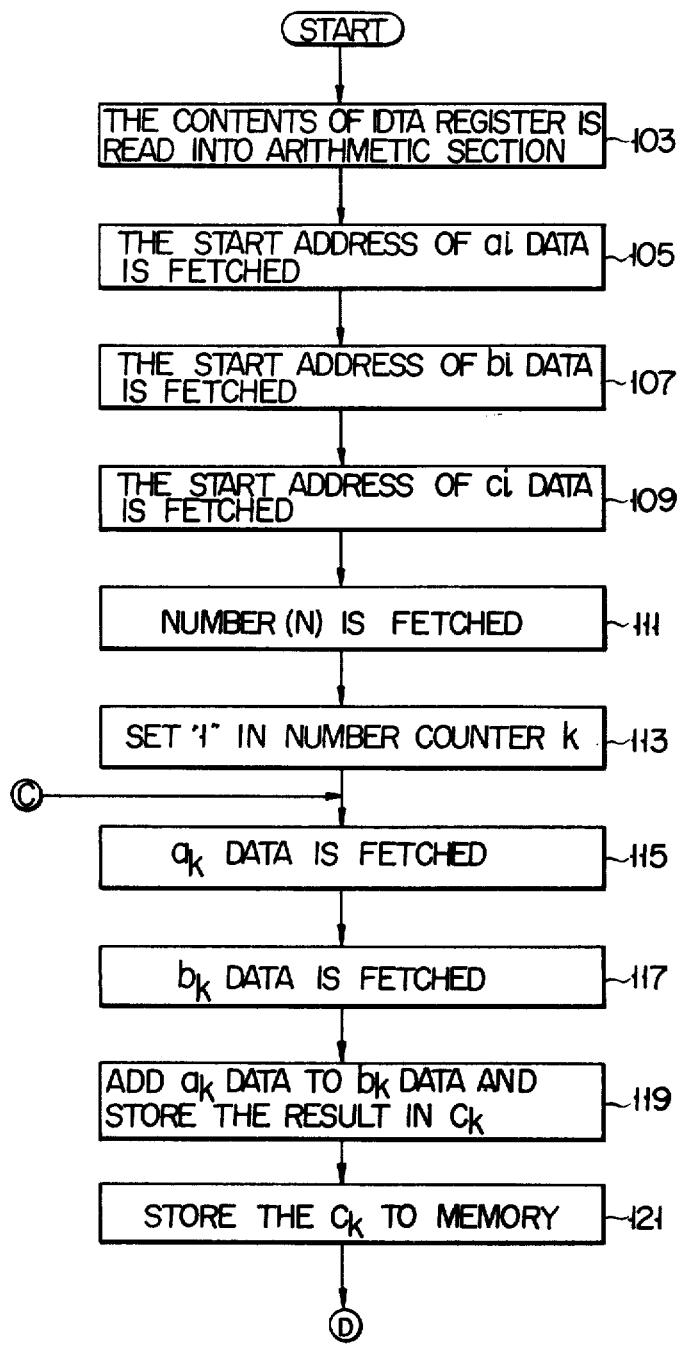
FIGS. 8A and 8B cooperate to form a flow chart of a computing sequence of the array data.
Figure 8B:
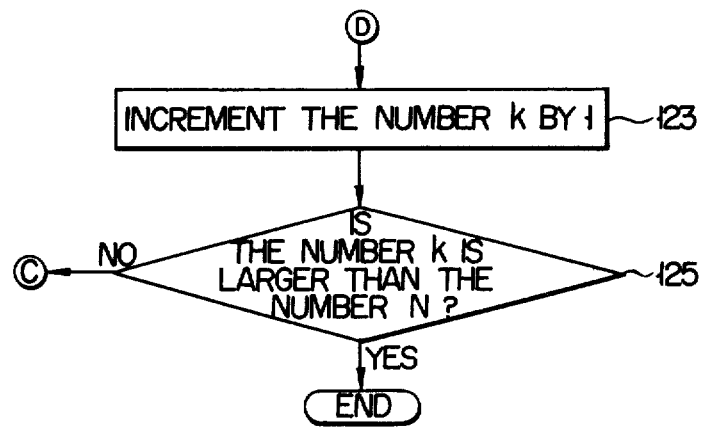

The arithmetic routine #2 starting at the address 100 is performed as shown in FIG. 8, for example. The central portion of such a program, or an addition loop, is of the usual type. In a block 103, the contents of the IDTA register 39 are loaded into the arithmetic logic section 25. The first address of a table necessary for starting the operation as previously stated has been prestored in the IDTA register 39. In this example, an address "500" is loaded into the arithmetic logic section 25. The arithmetic logic section 25 transfers the address "500" to the MAR 49 to give a Read command to the main memory 35 through the DMA interface 23. "Read" indicates a direction for the slave computer to read (data flows main memory to slave processor).

In response to the read command, the DMA interface 23 reads the contents of the address 500 of the main memory 35 (1000 of the start address of the array $a_i$, in this example,) to be loaded into the MSR 53 (block 105). The arithmetic logic section 25 loads the first address of the array $a_i$, or the contents of the MSR 53, into the internal register. Similarly, while incrementing the address, the first address of the $b_i$ array, the first address of the $c_i$ array, and the number of the operations are sequentially loaded into the register of the arithmetic logic section 25 (blocks 107, 109 and 111). Then in blocks 115 and 117, $a_k$ data ($k=1$, 1000) and $b_k$ data ($k=1$, 1000) are fetched and, in a block 119, $a_k$ data and $b_k$ data are added and the result of the addition $c_k$ is stored into $c_k$. Then, in a block 121 the $c_k$ is stored into the memory.

Then, in a block 123 a pointer K is incremented by one. In a block 125 the pointer K is compared with the number of data N. In the comparison, when the value of the pointer K fails to reach the N, the control is returned to the block 115 where similar process and computation are performed. The operation loop of the blocks 115 to 125 performs the operations listed in the flow chart shown in FIG. 8. In the slave computer, however, the fetch and the addition of the data are overlapped in a pipeline manner and all of the operations are completed within the access time of the main memory 35.

An example of the addition program is illustrated in TABLE 1. The operation of the arithmetic logic section 25 and the memory request are described in the microprogram of the ROM 61. The basic cycle of the slave computer is 200 ns, for example, and the cycle time of the main memory is 800 ns, for example. Therefore, the slave computer can perform one step of the program for one memory cycle.

the array data a; BA an address of the array data b; CA an address of the array data c; N the number of opera-

TABLE 1

| ADDRESS | ARITHMETIC SECTION | MEMORY REQUEST/ SYNCHRONIZE | REMARKS |
|---|---|---|---|
| a | k←0 | REQ(R) | COUNT CLEAR, READ REQUEST |
| a+1 | AA→MAR | MSYN | SEND $a_1$ ADDRESS |
| a+2 | AA incr | | UPDATE a ARRAY ADDRESS |
| a+3 | nop | | |
| a+4 | | REQ(R) | READ REQUEST |
| a+5 | BA→MAR | MSYN | SEND $b_1$ ADDRESS |
| a+6 | MAR→$R_1$ | | TRANSFER $a_1$ DATA TO $R_1$ |
| a+7 | BA incr | | UPDATE b ARRAY ADDRESS |
| a+8 | nop | REQ(R) | READ REQUEST |
| a+9 | AA→MAR | MSYN | SEND $a_i$ ADDRESS |
| a+10 | MSR+$R_1$→$R_2$ | | $b_1+a_1$→$R_2(c_1)$ |
| a+11 | AA incr | | UPDATE a ARRAY ADDRESS |
| a+12 | nop | REQ(R) | READ REQUEST |
| a+13 | LOOP BA→MAR | MSYN | SEND $b_j$ ADDRESS |
| a+14 | MSR→$R_1$ | | TRANSFER $a_i$ DATA TO $R_1$ |
| a+15 | BA incr | | UPDATE b ARRAY ADDRESS |
| a+16 | $R_2$→MDR | REQ(W) | SEND $c_{i-1}$ TO MDR |
| a+17 | CA→MAR | MSYN | SEND $c_{i-1}$ ADDRESS |
| a+18 | MSR+$R_1$→$R_2$ | | $b_i+a_i$→$R_2(c_i)$ |
| a+19 | CA incr | | UPDATE c ARRAY ADDRESS |
| a+20 | k incr | REQ(R) | COUNT UP |
| a+21 | AA→MAR | MSYN | SEND $a_{i+1}$ ADDRESS |
| a+22 | AA incr | | UPDATE a ARRAY ADDRESS |
| a+23 | k−N | | } CHECK THE NUMBER OF TIMES |
| a+24 | BNZ LOOP | | |
| a+25 | STOP | | END |

Figure 9:
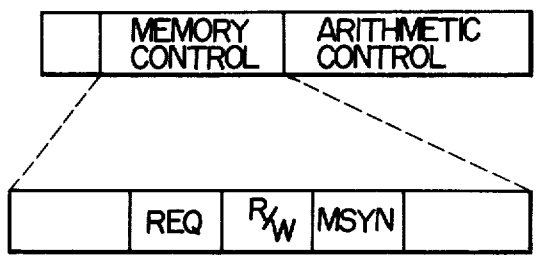
FIG. 9 is a format of a microinstruction used in the embodiment shown in FIG. 2.
Figure 10:
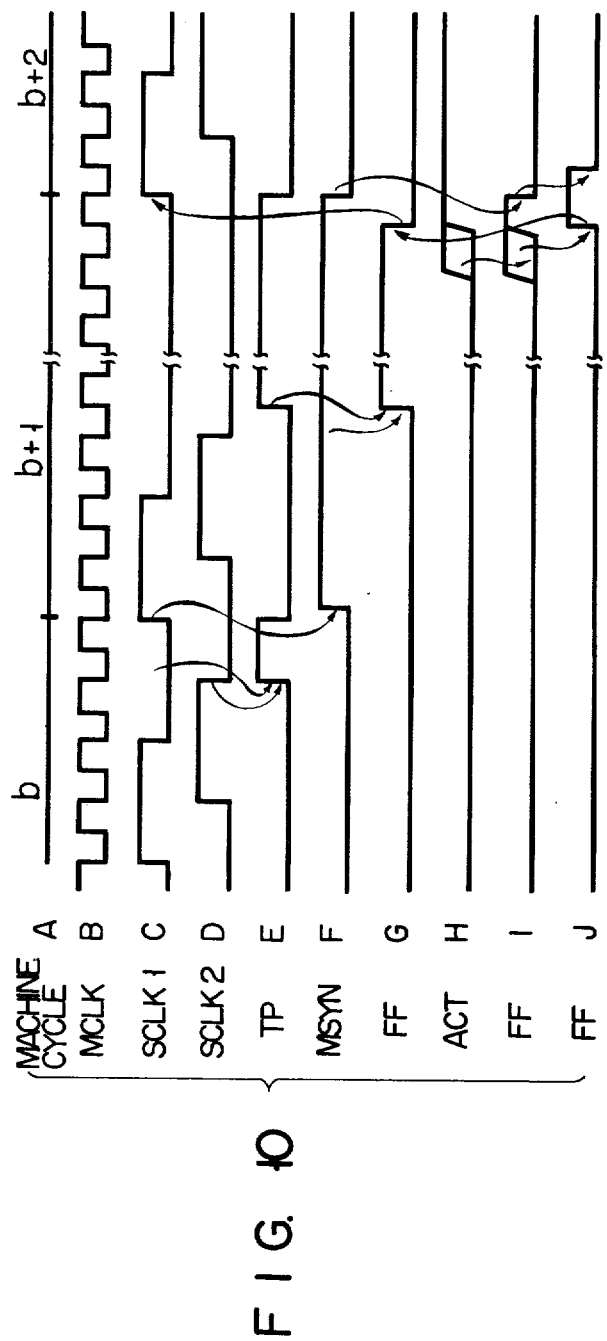
FIG. 10 is a timing chart illustrating timings of the operation of the embodiment shown in FIG. 2.

Each microinstruction of the arithmetic routine has a memory control section and an arithmetic control section, as shown in FIG. 9. In TABLE 1, the arithmetic section indicates the operations described in the arithmetic control section and the memory request/synchronize indicates the operations described in the table. The arithmetic control section has an OP code, a source address, and a destination address, which are usually used. The description of those will be omitted, however.

The memory control section has three bits REQ, R/W and MSYN, as illustrated in FIG. 9. The REQ bit is a bit to direct the request to the main memory 35, the R/W bit is a bit to direct if the request is the read or the write for the main memory 35, and the MSYN bit indicates the synchronization with the memory cycle. Of those bits, the contents of the REQ bit and R/W bit are supplied to the DMA controller 47 and the contents of the MSYN bit is supplied to the clock circuit 29. The DMA controller 47 produces a request signal and an R/W signal to the main memory 35 in accordance with the contents of the REQ bit and the R/W bit.

In TABLE 1, REQ(R) indicates that the REQ bit and the R/W bit are set (to Read). Similarly, REQ(W) indicates that REQ bit and R/W bit are set (to Write).

Upon the memory request, the memory cycle of the main memory 35 starts. In this example, when the memory request with higher priority is received, the memory cycle is so programmed as to start delayed by two steps from the step which issued the memory request. In other words, after approximately 400 ns since the memory request is issued, an actual memory cycle starts corresponding to the memory request.

In TABLE 1, symbols k, AA, BA, N, $R_1$, $R_2$ and CA are names assigned to specific registers in the register file 57. In those names, k designates counters corresponding to the number of operations; AA an address of tions (the number of data) previously given by the table; $R_1$ and $R_2$ working registers. As the present embodiment uses the Am 2901 for the arithmetic section 25, the MAR 49 and MDR 51 are connected to the Y output port of the AM 2901, and the MSR 53 is connected to the D input port. Accordingly, the loading and the fetching operations of the contents of these registers are possible by the microprogram.

In the microprogram in TABLE 1, the addresses from a to a+12 indicate an initializing step since it is impossible to process those addresses from the first data in the pipeline manner. The steps from the address (a+13) to the address (a+24) indicate a loop in a normal state.

In the cycle of the main memory 35, $a_i$ and $b_i$ (a and b represent "Read") are read such as ($a_1$, $b_1$), ($a_2$, $b_2$, $c_1$), ($a_3$, $b_3$, $c_2$), ($a_4$, $b_4$, $c_3$) . . . and $c_{i-1}$ obtained in the previous cycle is written. The process of four internal cycles is possible within one memory cycle. Accordingly, the address control of DMA and the count of the loop, and the like are overlapped with the memory cycle, as shown in the program, so that the computation is pipelined and all of the computations are completed within the access time to the memory.

The microprogram in TABLE 1 will again be described with relation to the operation of the host main memory 35. One memory cycle of the host main memory 35 corresponds to four steps of the microprogram. Accordingly, with MSYN of the address (a+1), the step of the address (a+2) is synchronized with the memory cycle. Thus, the memory cycle starts one step after the memory request is issued. Therefore, the time taken from the address (a+2) to the address (a+5) corresponds to one memory cycle and here the array data $a_1$ is Read. Likewise, the addresses (a+6) to (a+9)

correspond to one memory cycle and here the array data $b_1$ is Read. Similarly, the addresses (a+10) to (a+13) are for Read of $a_2$; the addresses (a+14) to (a+17) for Read of $b_i$; the addresses (a+18) to (a+21) for Write of $c_{i-1}$; the addresses (a+22) to (a+24) for Read of $a_{i+1}$.

In the program, when the access request to the host main memory 35 is issued, the memory cycle starts immediately (after approximately 400 ns). The actual host main memory 35, however, is commonly used by the CPU 31, the slave computer and DMA devices such as a magnetic disc and a magnetic tape. The devices individually request services for the host main memory 35 and exclusively use the memory cycle only when the request is accepted. Also during a period that the program shown in this example runs, it is impossible for the slave computer to continuously use the memory cycle. In this case, it must operate using the memory with any other device.

To this end, the synchronizing circuit is provided in the slave computer so that from an instant that the access request to the host main memory 35 is issued until an acknowledge signal representing that the request is accepted is received, the slave computer internal clock is stopped and the slave computer is operated always to synchronize with the memory cycle of the main memory assigned thereto. The operation timing diagram for taking such a synchronization is illustrated in FIGS. 10A to 10J.

Figures 11, 12:
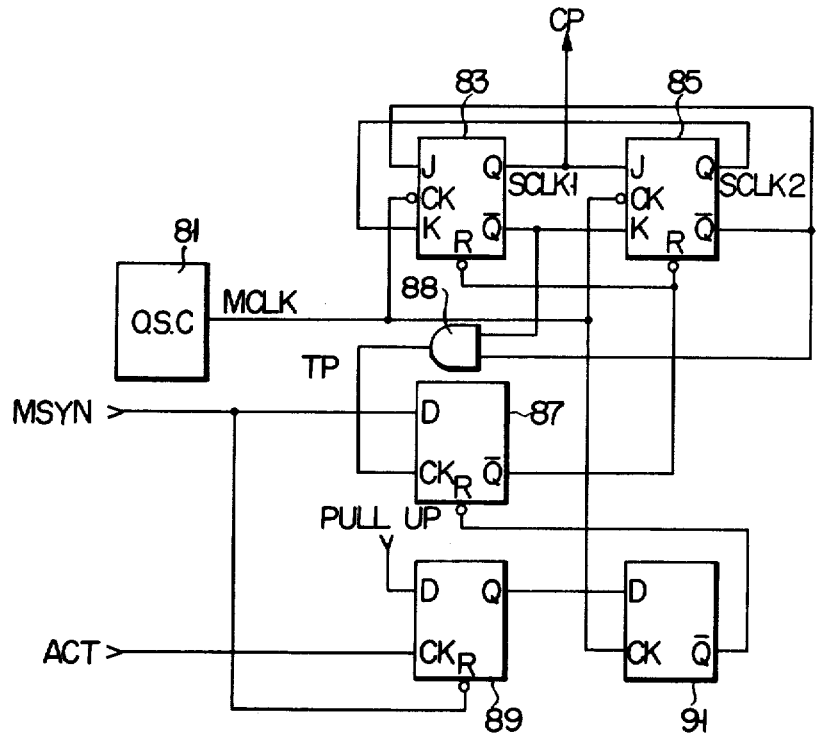
FIG. 11 is a block diagram of a clock circuit shown in FIG. 2.
FIG. 12 graphically illustrates relations of addresses and mnemonic contents.

An example of the circuit construction of the clock circuit 29 which also serves as a synchronizing circuit is shown in FIG. 11. MCLK in FIG. 10B designates a clock signal generated by the oscillating circuit 81. The clock signal is frequency-divided by the flip-flops 83 and 85 thereby to form clock signals SCLK1 and SCLK2. These signals SCLK1, SCLK2 are supplied to a disable flip-flop 87 through a logic multiplying circuit 88. The machine cycle is determined by the clock signal SCLK1.

The memory synchronizing operation is performed by the microprogram as shown in FIG. 12, for example. That is at address b, an access request to the memory is issued and the machine cycle at the address b+1 should be elongated till the memory cycle is assigned to synchronize therewith. Accordingly, the memory synchronizing operation is specified (M, SYNC command). The execution of the program will be described using the timing chart.

When the program in the address b+1 is executed after the program in the address b is executed, the M and SYNC commands cause the MSYN signal to synchronize with the SCLK1 thereby to be active. The DISA flip-flop 87 is set by the timing pulse TP formed by the SCLK1 and SCLK2, so that the output $\bar{Q}$ of the DISA flip-flop 87 resets the flip-flops 83 and 85. Under this condition, the clock signals SCLK1 and SCLK2 are halted. Then, the main memory returns a signal ACT to accept the access to the memory, to the circuit. At the leading edge of the ACT signal, the ACT latch 89 is set.

Since the ACT signal is asynchronous, the ACT latch 89 is made to be synchronized with the MCLK and the DISA flip-flop 87 is reset by the output $\bar{Q}$ of the SYNC flip-flop 91. Upon the reset, the output $\bar{Q}$ of the DISA flip-flop 87, which has reset the flip-flops 83 and 85, becomes inactive and the SCLK1 and SCLK2 become active again. At this time, the execution of the program starts to progress and the execution of the program in the address b+2 is started. By performing such synchronizing operation, the internal operation may be performed with respect to the common use of the memory, correctly and smoothly.

According to the invention, the slave computer has internal registers but no internal random access memory. Accordingly, a large amount of data may be processed at a high speed by using an inexpensive slave computer, so that the computer system of the invention has a high performance/cost ratio. In the above-mentioned embodiment, the space for the slave computer on a single print substrate of 12×12 inches is almost the same as compared with the conventional one.

The additional use of the slave computer never interferes with the host computer system but takes charge of processing, for example, the picture data, and the array data, which are not processed well by the host computer. This improves the data processing speed of the whole system. The operation for the host computer to start the slave computer is simplified and this indicates that the computer system is easy to use from the host computer side.

A preferable application of the invention is a computed tomography (CT) system which irradiates the X ray beam onto the exterior of a patient to collect the data transmitted therethrough and to obtain a tomogram of the diseased part of the patient by processing the transmitted data by means of a computer. To obtain the tomogram, a calculation called a back projection is performed. The amount of the data used in the back projection ranges from several tens thousand to several hundreds thousand. Such an enormous amount of data may be processed in a short time by the computer system of the present invention. The CT apparatus includes a computer system generally and is extremely expensive. The use of the computer system of the invention reduces the cost of the CT apparatus.

What we claim is:

1. In a data processing system including a host central processing unit and a host main memory, a slave computer connected to said host central processing unit and said host main memory said slave computer comprising:
   (a) a set of data registers providing the sole operand storage capability of said slave computer;
   (b) arithmetic logic operating means, coupled to said data registers and having an operation cycle time shorter than the memory cycle time of said host main memory, for performing computations involving the operands in said data registers and for computing addresses for a said host main memory;
   (c) DMA interface means connected to said host main memory, to said data registers, and to said arithmetic logic operating means for transferring data from said host main memory directly to said arithmetic logic operating means through said data registers and for directly loading the results of computations by said arithmetic logic operating means into said host main memory;
   (d) microprogram control means connected to said arithmetic logic operating means and to said DMA interface means for controlling the operation of said microprogram control means and said DMA interface means;
   (e) input/output interface means connected between said central processing unit and said microprogram control means to transfer command information from said host central processing unit to said microprogram control means; and (f) clock circuit means connected to said arithmetic logic operating means and to said microprogram control means for generating slave computer system clocks which operate independently of any clock signals in said host central processing unit or in said host main memory.

2. A data processing system according to claim 1, wherein the address computation for the host main memory and the computation of operand data taken out from said host main memory are performed together in said arithmetic logic operating means.

3. A data processing system according to claim 1, wherein said clock circuit means includes means for inhibiting the generation of said slave computer system clocks operating independently of said host main memory clock signals and means for generating slave computer system clocks in synchronism with the memory clock cycle of said host main memory.

4. A data processing system according to claim 1, wherein said microprogram control means includes set-up routine means and a microprogram memory for storing the arithmetic logic routine, said set-up routine causing command information supplied from said host central processing unit to be fetched to direct said slave computer to perform the desired operations.

5. A data processing system according to claim 1, wherein said DMA interface means comprises:
a memory address register for holding an address to fetch data from said host main memory or to store data into said host main memory;
a memory data register for holding results of computation for storage into said host main memory;
a memory storage register for holding data fetched from said host main memory; and
a DMA controller for holding a memory request signal and a read/write signal for said host main memory, and for receiving an acknowledge signal from said host main memory.

6. A data processing system according to claim 1, wherein said microprogram control means comprises:
a read only memory for storing a microprogram;
a microprogram sequencer for supplying addresses for microprograms stored in said read only memory;
a pipeline register for holding each instruction of a microprogram read out from said read only memory;
a branch condition circuit for supplying branch specifying signals to said microprogram sequencer on the basis of the computations from said arithmetic control means.

7. A data processing system according to claim 6, wherein said branch condition circuit comprises:
a condition code selector which receives condition signals outputted from said input/output interface means and flag signals outputted from said arithmetic logic operating means, and selectively outputs those on the basis of control signals supplied from said microprogram control means; and
a logic circuit connecting to the output of said condition code selector which receives a condition signal or a flag signal outputted from said condition code selector and a control signal from said microprogram control means thereby to supply said branch specifying signals to said microprogram control means.

8. A data processing system according to claim 1, wherein said clock circuit means comprises:
an oscillator for oscillating basic clock signals;
first and second frequency-dividing flip-flop circuits which receive the basic clock signals from said oscillator and produce first and second frequency-divided clock signals;
a logic multiplying circuit for receiving frequency-divided clock signals from said first and second flip-flops to produce a given timing pulse signal;
a disable flip-flop which receives an output signal from said logic multiplying circuit to reset said first and second frequency-dividing flip-flops thereby to halt production of said frequency divided clock signals;
a latch circuit which receives a memory access acknowledge signal from said host main memory to produce a logical high level signal; and
a synchronous flip-flop circuit which receives an output signal from said latch circuit to supply a synchronous signal to said disable flip-flop and to reset said disable flip-flop thereby to make active said first and second frequency-dividing flip-flops.

* * * * *